3,189,409
MANUFACTURE OF POTASSIUM BICARBONATE
Friedrich Wolstein, Hannover, Germany, assignor to Kali-Chemie Aktiengesellschaft, Hannover, Germany
No Drawing. Filed Dec. 30, 1960, Ser. No. 79,534
Claims priority, application Germany, Jan. 2, 1960, K 39,576; Spain, Dec. 15, 1960, 263,256
2 Claims. (Cl. 23—64)

The invention relates to the manufacture of potassium bicarbonate from potassium chloride.

As is well known, the Solvay process cannot be applied to the manufacture of potassium bicarbonate. Therefore, for decades attempts have been made to modify the ammonia-soda process in such a way that it becomes suitable for the preparation of potassium bicarbonate. In particular, it has been proposed to replace the ammonia by an organic amine whereby the potassium chloride is reacted in the aqueous amine solution with introduction of $CO_2$. Various amines have been proposed for such procedure.

I have found that the use of triethylamine in said process increases the yield at a surprising degree and improves the purity of the obtained product, thereby improving the economy of the process.

According to the method of the present invention, triethylamine is combined with an aqueous potassium chloride solution, and $CO_2$ is introduced into said mixture with vigorous stirring, while the temperature is maintained at about 50° C. The reaction is terminated after about 4 hours. A very pure potassium bicarbonate, containing less than 0.2 percent of chlorine, is obtained in a yield of about 97 percent.

Instead of passing $CO_2$ into a mixture of a potassium chloride solution and triethylamine, triethylamine bicarbonate may be added directly to the potassium chloride solution. The triethylamine bicarbonate is obtained in a very simple manner by introducing 1 mole $CO_2$ in a mixture of 1.2 moles of triethylamine and 1 mole of water with vigorous stirring. In this way, 80 percent of the triethylamine are converted to triethylamine bicarbonate, which forms a solid mass.

The good yield of my novel process is due to the fact that the solubility of potassium bicarbonate in the reaction mixture is decreased very strongly by the first formed triethylamine bicarbonate. It is, therefore, of advantage to operate with an excess of 0.1 to 0.5 mole of triethylamine.

In the reaction of potassium chloride and triethylamine bicarbonate triethylamine hydrochloride is formed, which is readily processed, since the triethylamine is only sparingly soluble in water. When adding lime to the mother liquor, the formed calcium chloride reduces the solubility of the triethylamine still further. Said mother liquor contains, in addition to very small amounts of unreacted potassium chloride and the carbonate of triethylamine, essentially triethylamine hydrochloride; after addition of lime, triethylamine separates from the aqueous layer on addition of a few drops of an emulsion breaking agent, whereupon it is readily recovered without heat supply.

It is, of course, also possible to distill off the amine after it has been set free by lime. This can be done very economically because triethylamine forms with 10% of water an azeotropic mixture which distills at 75.8° C. and can be recovered in this way in pure form with only little heat expenditure.

The following examples are given to illustrate the invention.

Example 1

150 g. of triethylamine were vigorously stirred with 75 g. of potassium chloride and 175 g. of water with simultaneous introduction of $CO_2$. The reaction temperature was about 50° C., and the reaction mixture was allowed to stand at said temperature for a period of about 4 hours. There were obtained 98 g. of $KHCO_3$ containing 0.15 percent of chlorine, which corresponded to a yield of almost 98 percent. The mother liquor was admixed with lime to recover the triethylamine. An emulsion of triethylamine and water was formed, which was broken by addition of few drops of a commercial emulsion breaking agent i.e. Emulsionsspalter 4400 (supplier: Anorgana, Munich, Germany). The separated triethylamine could be easily decanted.

Example 2

328 g. of triethylamine bicarbonate (80%) were stirred for about 1 hour with 75 g. of potassium chloride dissolved in 220 g. of water. There precipitated 96 g. of potassium bicarbonate containing 0.1 percent of chlorine, corresponding to a yield of 96 percent. After addition of lime to the mother liquor, 99.9 percent of the triethylamine was recovered by azeotropic distillation at 75.8° C.

I claim:

1. A method of preparing potassium bicarbonate comprising reacting potassium chloride with a member of the group consisting of triethylamine bicarbonate and a mixture of triethylamine and carbon dioxide, recovering the precipitated potassium bicarbonate, adding lime to the mother liquor containing triethylamine hydrochloride, thereby obtaining the major part of said triethylamine as a separate layer, decanting said layer, and distilling off residual triethylamine as an azeotropic mixture with water.

2. A method of preparing potassium bicarbonate comprising reacting potassium chloride with a member of the group consisting of triethylamine bicarbonate and a mixture of triethylamine and carbon dioxide, recovering the precipitated potassium bicarbonate, adding lime to the mother liquor containing triethylamine hydrochloride, thereby obtaining the major part of said triethylamine as a separate layer, and decanting said layer.

References Cited by the Examiner
UNITED STATES PATENTS

| | | | |
|---|---|---|---|
| 2,752,222 | 6/56 | Birman | 23—64 |
| 2,768,060 | 10/56 | Follows | 23—64 |
| 2,782,093 | 2/57 | Hulot | 23—64 |
| 2,905,529 | 9/59 | Rubin | 23—64 X |

MAURICE A. BRINDISI, Primary Examiner.
GEORGE D. MITCHELL, Examiner.